(12) United States Patent
Demianovich et al.

(10) Patent No.: US 11,598,318 B2
(45) Date of Patent: Mar. 7, 2023

(54) ASSEMBLY AND METHOD FOR PREVENTING EXPOSURE OF PERSONNEL TO AN OPENING DEFINED BY A SURFACE OF A WIND TURBINE

(71) Applicant: General Electric Company, Schenectady, NY (US)

(72) Inventors: Nicholas Demianovich, Simpsonville, SC (US); James Eric Reed, Spartanburg, SC (US); Gary Wayne Holladay, Greenville, SC (US); Owen Devlin Gauthier, Greenville, SC (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 16/713,587

(22) Filed: Dec. 13, 2019

(65) Prior Publication Data
US 2021/0180573 A1  Jun. 17, 2021

(51) Int. Cl.
| F03D 80/80 | (2016.01) |
| F03D 13/20 | (2016.01) |
| F03D 80/50 | (2016.01) |

(52) U.S. Cl.
CPC ........... *F03D 80/88* (2016.05); *F03D 13/20* (2016.05); *F03D 80/50* (2016.05); *F05B 2230/61* (2013.01); *F05B 2240/14* (2013.01); *F05B 2240/912* (2013.01); *F05B 2240/916* (2013.01)

(58) Field of Classification Search
CPC .......... F03D 80/88; F03D 13/20; F03D 80/50; F03D 80/00; F03D 80/80; F05B 2230/61; F05B 2240/14; F05B 2240/912; F05B 2240/916; Y02E 10/72; Y02E 10/728
See application file for complete search history.

(56) References Cited

U.S. PATENT DOCUMENTS

| 3,165,211 A | 1/1965 | Ablett et al. |
| 3,389,739 A | 6/1968 | Kummerman et al. |
| 5,613,728 A | 3/1997 | Smith et al. |
| (Continued) | | |

FOREIGN PATENT DOCUMENTS

| EP | 3450752 A1 | 3/2019 |
| EP | 3486207 A1 | 5/2019 |

OTHER PUBLICATIONS

European Search Report for EP Application No. 20213104.1, dated May 6, 2021.

*Primary Examiner* — Aaron R Eastman
(74) *Attorney, Agent, or Firm* — Dority & Manning, P.A.

(57) ABSTRACT

An assembly and method are provided for preventing exposure of personnel to an opening defined by a surface of a wind turbine. Accordingly, a hatch assembly is arranged adjacent to the opening. The hatch assembly includes a frame structure and a support structure. The frame structure includes a plurality of frame members arranged together to at least partially surrounded opening the plurality of frame members further define a passageway for receiving the support surface. The support surface is slidable between a first position and a second position. The support surface occludes the opening defined by the surface of the wind turbine when the support surface is in the first position and occludes the passageway defined by the plurality frame members when in the second position so as to prevent exposure of personnel to the opening.

9 Claims, 12 Drawing Sheets

(56) References Cited

U.S. PATENT DOCUMENTS

| | | | |
|---|---|---|---|
| 8,256,164 B2* | 9/2012 | Cuccurullo | E04D 13/0335 |
| | | | 52/200 |
| 8,522,487 B2* | 9/2013 | Whiting | E06C 7/182 |
| | | | 52/72 |
| 9,045,906 B1* | 6/2015 | Richey | E04D 13/0357 |
| 10,435,274 B2 | 10/2019 | Chin et al. | |
| 2010/0111665 A1* | 5/2010 | Daniels | F03D 80/50 |
| | | | 414/814 |
| 2010/0326769 A1* | 12/2010 | Cuccurullo | E06C 9/10 |
| | | | 182/100 |
| 2011/0248506 A1 | 10/2011 | Ruiz Urien et al. | |
| 2012/0146335 A1 | 6/2012 | Bywaters et al. | |
| 2014/0005059 A1 | 1/2014 | Zhang et al. | |
| 2015/0316024 A1* | 11/2015 | Larsen | F03D 80/50 |
| | | | 104/106 |
| 2016/0195067 A1* | 7/2016 | Mathiasen | F03D 13/20 |
| | | | 52/745.18 |
| 2017/0022966 A1* | 1/2017 | Therkildsen | F03D 80/88 |
| 2018/0112413 A1 | 4/2018 | Palasek et al. | |
| 2019/0072078 A1* | 3/2019 | Munk-Hansen | F03D 80/88 |
| 2020/0199894 A1* | 6/2020 | Soerensen | E04G 21/3204 |
| 2021/0156366 A1* | 5/2021 | Munk-Hansen | F03D 80/88 |
| 2022/0112875 A1* | 4/2022 | Bech | F03D 1/0675 |
| 2022/0127114 A1* | 4/2022 | Munk-Hansen | B66C 1/108 |

\* cited by examiner

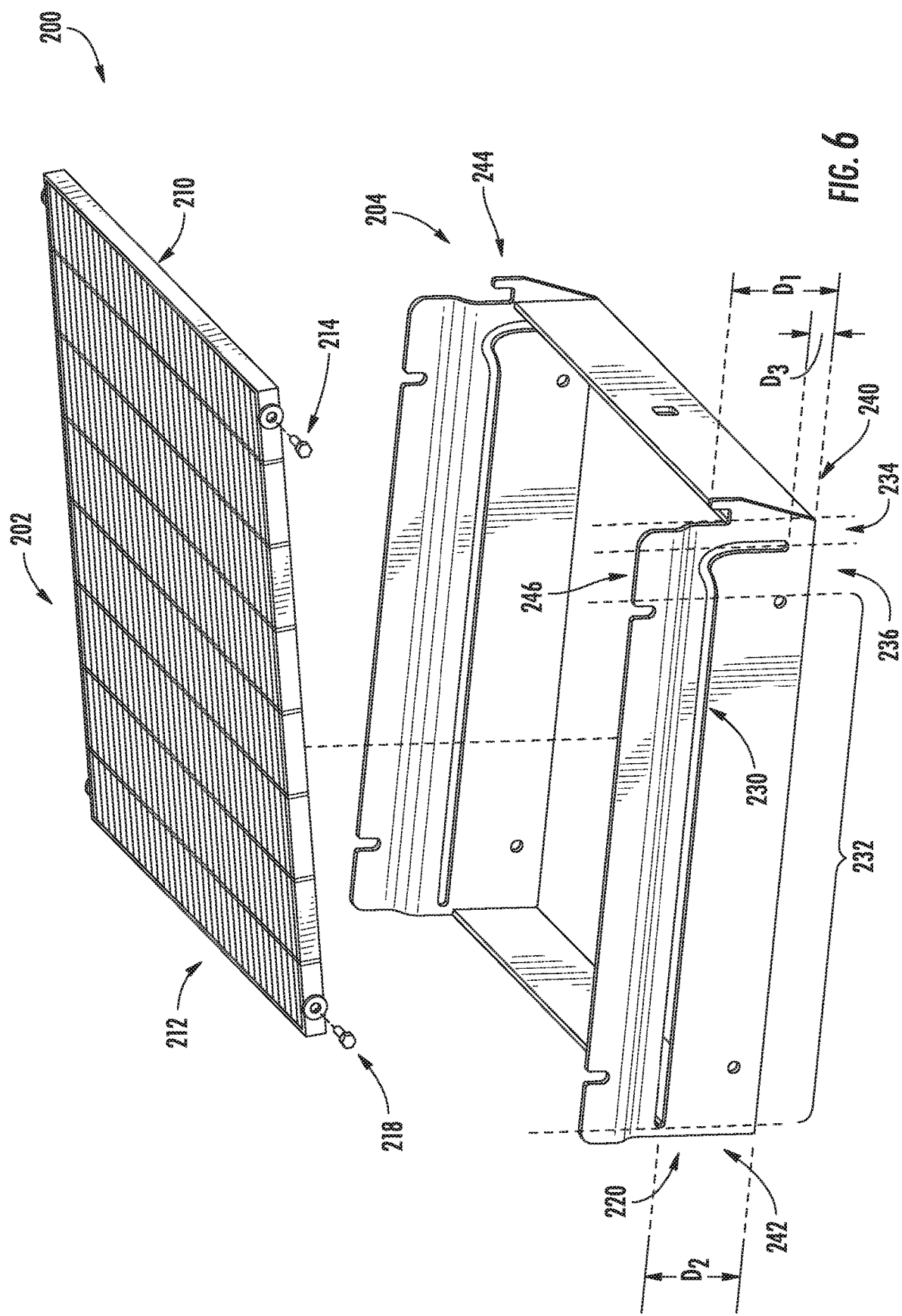

ASSEMBLY AND METHOD FOR PREVENTING EXPOSURE OF PERSONNEL TO AN OPENING DEFINED BY A SURFACE OF A WIND TURBINE

FIELD

The present disclosure relates in general to wind turbines, and more particularly to an assembly and method for preventing exposure of personnel to an opening defined by a surface of the wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

In order to access various portions of the wind turbine, openings may be defined within surfaces of the wind turbine. Typically, these openings may be positioned to permit the passage of personnel and/or cargo therethrough. The openings are often covered when not in use with a hatch, doorway, or other similar covering. Access to the opening is typically obtained by pivoting the cover about a hinge element or, if space permits, sliding the cover parallel to the surface defining the opening. When uncovered, the opening may present a fall hazard to personnel within, or on, the wind turbine.

Due to space constraints, it is often not possible to hoist cargo clear of the railings or the swing arc of a hinged cover. Thus, the cover must be opened prior to the suspension of the cargo, or the cargo must be removed prior to closing the cover. In either case, personnel must have both the swing-arm gate open and the opening uncovered while accessing the cargo. This, in turn, exposes the personnel to the fall hazard of the uncovered opening.

Thus, the art is continuously seeking new and improved systems and methods that address the aforementioned issues. Accordingly, the present disclosure is directed to an improved hatch assembly for a wind turbine and methods for operating the same.

BRIEF DESCRIPTION

Aspects and advantages of the invention will be set forth in part in the following description, or may be obvious from the description, or may be learned through practice of the invention.

In one aspect, the present disclosure is directed to a wind turbine. The wind turbine may include a tower, a nacelle mounted atop the tower, and a rotor mounted to the nacelle. The rotor may include a rotatable hub having one or more rotor blades secured thereto. The wind turbine may also include an opening defined by a surface of the wind turbine. Further, the wind turbine may include a hatch assembly arranged adjacent to the opening. The hatch assembly may include a frame structure and a support surface. The frame structure may include a plurality of frame members arranged together to at least partially surround the opening. The plurality of frame members may further define a passageway for receiving the support surface. The support surface may be slidable between a first position and a second position. The support surface may occlude the opening defined by the surface of the wind turbine when the support surface is in the first position. The support surface may occlude the passageway defined by the plurality of frame members of the frame structure when in the second position so as to prevent exposure of personnel to the opening defined by the surface of the wind turbine.

In an embodiment, the frame structure may define at least one guideway. The guideway may define a guide path for an end of the support surface.

In an embodiment, the guideway may also include a first guide path portion oriented parallel to the surface of the wind turbine. The guideway may include a second guide path portion oriented perpendicular to the surface of the wind turbine. The second guide path portion may be positioned proximate to the passageway defined by the frame structure. Additionally, the guideway may include a transitional guide path portion operably coupling the first guide path portion to the second guide path portion.

In an embodiment, the support surface may extend between a first end and a second end disposed opposite thereof. The support surface may have at least one locking pin disposed at the first end and at least one glide pin disposed at the second end. The glide pin(s) may be configured to be retained by at least one guideway defined by the frame structure. The locking pin(s) may be positioned to be received by at least one pin receiver of the frame structure so as to secure the support surface in the second position.

In an additional embodiment, the pin receiver(s) may be positioned on the plurality of frame member so as to prevent the first end of the support surface from passing into the passageway defined by the plurality of frame members of the frame structure.

In an embodiment, the first end of the support surface has a maximal extension beyond the frame structure of less than or equal to 30% of a length of the support surface.

In an embodiment, the frame structure may also include at least one securing element configured to receive the locking pin(s) of the support surface and secure the support surface in the first position. The securing of the support surface may prevent a horizontal movement of the support surface.

In an embodiment, the opening may be a cargo passage opening. The wind turbine may also include a lifting device disposed above, and in line with, the cargo passage opening.

In an embodiment, the lifting device supports a load suspended above the support surface. The vertical clearance between the support surface and the suspended load is greater than one (1) centimeter to less than 35 centimeters.

In another aspect, the present disclosure is directed to a method for operating a hatch assembly to occlude an opening of a wind turbine. The hatch assembly may have a frame structure and a support structure. The method may include arranging a plurality of frame members of the frame structure adjacent to the opening so as to at least partially surround the opening. The plurality of frame members may define a passageway for receiving the support surface. The method may include securing the support surface to the frame structure. The method may also include transitioning the support surface between a first position and a second position via at least sliding along a guideway of the frame structure. The first position may occlude the opening defined by the surface of the wind turbine. The second position may occlude the passageway defined by the plurality of frame members so as to prevent exposure of personnel to the opening.

In an embodiment, the support surface may extend between a first end and a second end disposed opposite thereof. The support surface may have at least one locking pin disposed at the first end and at least one glide pin disposed at the second end. The glide pin(s) may be configured to be retained by at least one guideway defined by the frame structure. Transitioning the support surface may also include raising or lowering the first end of the support surface so as to cause the second end of the support surface to rotate and slide along the guideway portion of the frame structure.

In an embodiment, transitioning the support surface into the second position may also include transitioning the support structure into a vertical orientation by raising the first end of the support surface above at least one pin receiver coupled to the plurality of frame members. The method may also include moving the second end of the support surface toward the surface defining the opening so as to secure the locking pin(s) in the pin receiver(s) thereby occluding the passageway defined by the plurality of frame members of the frame structure and securing the support surface in the second position.

In an embodiment, the method may include moving the support surface perpendicular to the surface so as to disengage the locking pin(s) from at least one pin receiver of the frame structure. The method may also include rotating and sliding a second end of the support surface between the opening and the suspended load so as to transition the support surface from second position to the first position. A clearance between the support surface and the suspended load may be greater than 2.5 centimeters to less than 30 centimeters.

In an embodiment, the method may further include lowering the load onto the support surface in the first position and decoupling the load from the lifting device.

In an additional embodiment, transitioning the support surface between the first position and the second position may occur in a space restricted environment wherein an obstruction may limit a first end of the support surface to a maximal extension beyond the frame structure of less than or equal to 30% of a length of the support surface.

In another aspect, the present disclosure is directed to a hatch assembly arranged adjacent to an opening defined by a surface. The hatch assembly may include a support surface extending between a first end and a second end disposed opposite thereof. The support surface may have at least one locking pin disposed at the first end and at least one glide pin disposed at the second end. The support surface may be at least slidable between a first position and a second position. The hatch assembly may also include a frame structure. The frame structure may include a plurality of frame members arranged together to at least partially surround the opening. The plurality of frame members may further define a passageway for receiving the support surface. The frame structure may define at least one guideway defining a guide path for the glide pin of the support surface detained therein. The guideway may include a first guide path portion oriented parallel to the surface, a second guide path portion oriented perpendicular to the surface, and a transitional guide path portion operably coupling the first guide path portion to the second guide path portion. The second guide path portion may be positioned proximate to the passageway defined by the frame structure. The support surface may include the opening defined by the surface when the support surface is in the first position. The support surface may occlude the passageway defined by the plurality of frame members of the frame structure when in the second position so as to prevent exposure of personnel to the opening defined by the surface. The locking pin(s) may be positioned to be received by at least one pin receiver of the frame structure so as to secure the support surface in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates a perspective view of a portion the hatch assembly of FIG. 4 according to one embodiment of the present disclosure;

Figure 1:
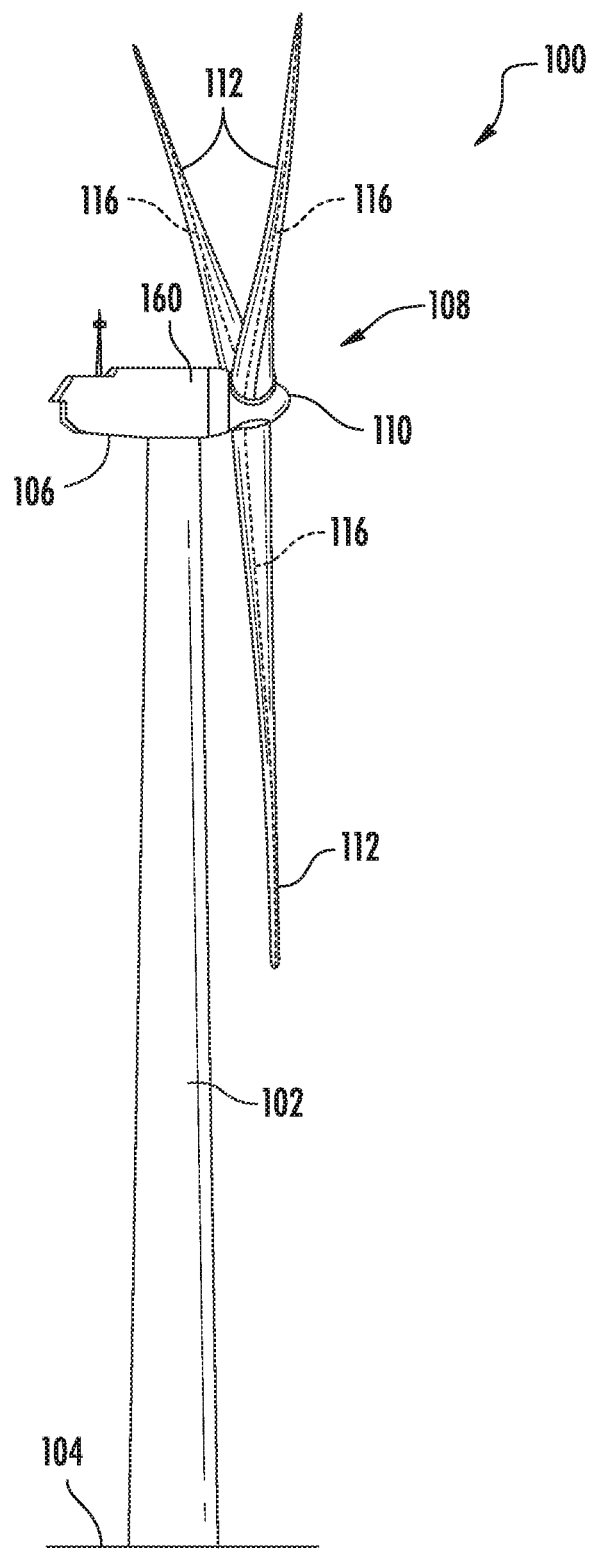
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an assembly and method for preventing exposure of personnel to an opening defined by a surface of a wind turbine. In particular, the present disclosure may include a hatch assembly. The hatch assembly may have a support surface, such as a grate, which is movable between two positions. In the first position, the support surface may occlude, cover, or otherwise obstruct the opening defined by the surface of the wind turbine. The hatch assembly may also have a frame structure that at least partially surrounds the opening. The frame structure may serve both as a railing and as a guideway for the support surface. For example, the frame structure may surround the opening on three sides, with the fourth side remaining open, providing access to the area above the opening so long as the support surface is in the first position. When the support surface is in the second position, the support surface may obstruct the open fourth side. In other words, the support surface in the second position may serve as a form of gate, preventing access to the opening when the opening is uncovered. The ability of the support surface to serve as a gate may eliminate the necessity for the frame structure to be equipped with a separate gate structure, such as a swing-arm gate. Further, because the support surface is either obstructing the opening, obstructing the open fourth side, or transitioning between the two positions, personnel may be prevented from ever being exposed to the fall hazard presented by the opening when it is uncovered.

In addition to the benefit of preventing exposure of personnel to the opening defined by the surface of the wind turbine, other benefits may be realized based on a movement path of the support surface as it is transitioned between the first and second positions. Specifically, the motion path disclosed herein permits the support surface to be transitioned between the first and second positions in a space-constrained application. This may include situations where obstructions prevent the free movement of the support surface. For example, a load may be hoisted through the opening while the support surface is in the second position. The support surface may then be transitioned to the first position while the load remains suspended within one inch of the support surface. Such a transition would not be possible using a typical hinged hatch as the load would interfere with the swing arc of the hatch. Additionally, because the opening may be covered by the support surface while the load is suspended above the opening, it may be possible to lower the load onto the support surface, so as to facilitate decoupling the load from the hoist mechanism. Again, due to the unique nature of the hatch assembly disclosed herein, this may be accomplished without exposing personnel to the fall hazard of the opening.

Referring now to the drawings, FIG. 1 illustrates a perspective view of one embodiment of a wind turbine 100 according to the present disclosure. As shown, the wind turbine 100 generally includes a tower 102 extending from a foundation 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
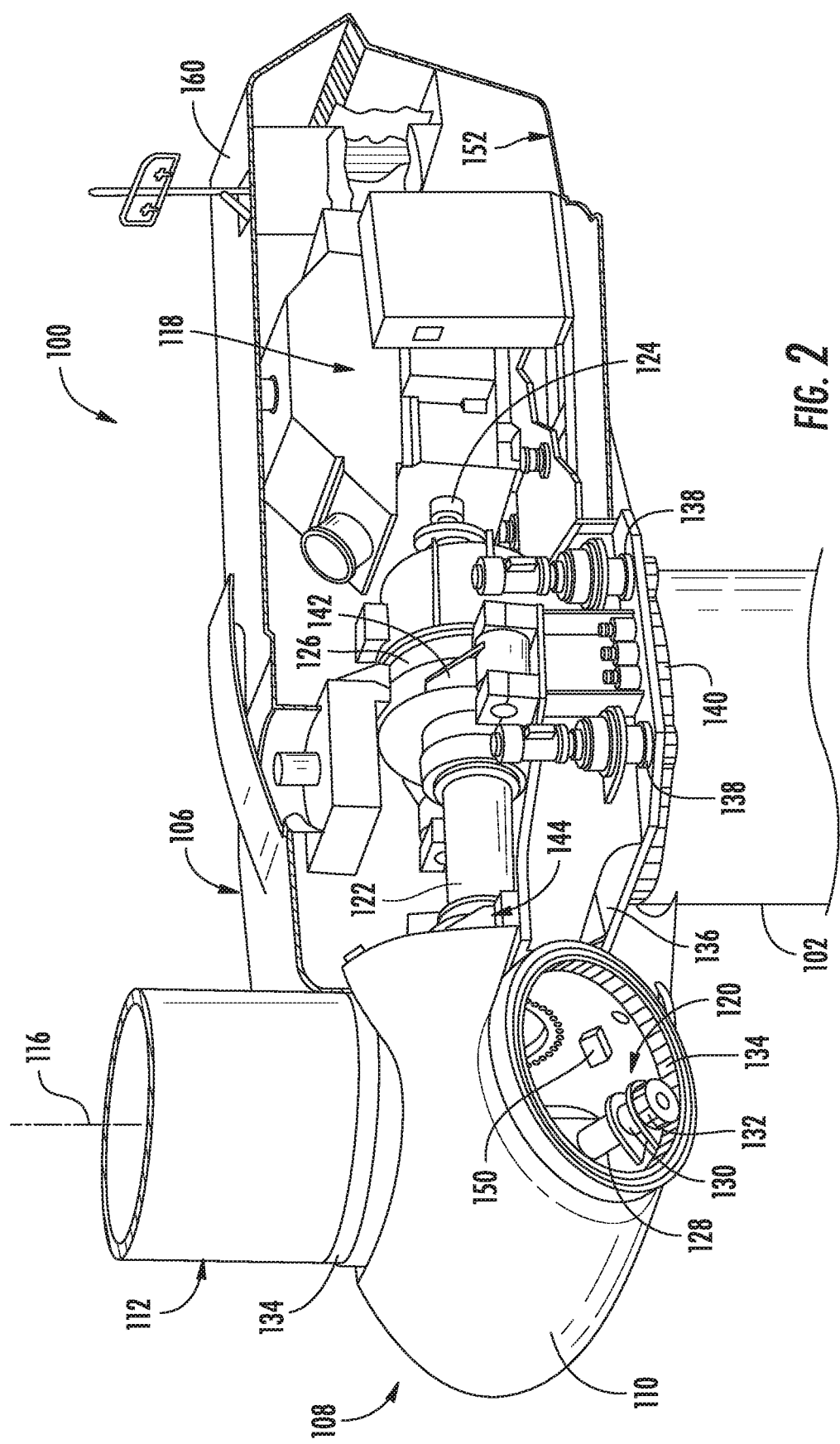
FIG. 2 illustrates a perspective, internal view of a nacelle of a wind turbine according to one embodiment of the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller, with each yaw drive mechanism(s) 138 being configured to change the angle of the nacelle 106 relative to the wind (e.g., by engaging a yaw bearing 140 of the wind turbine 100).

Figure 3:
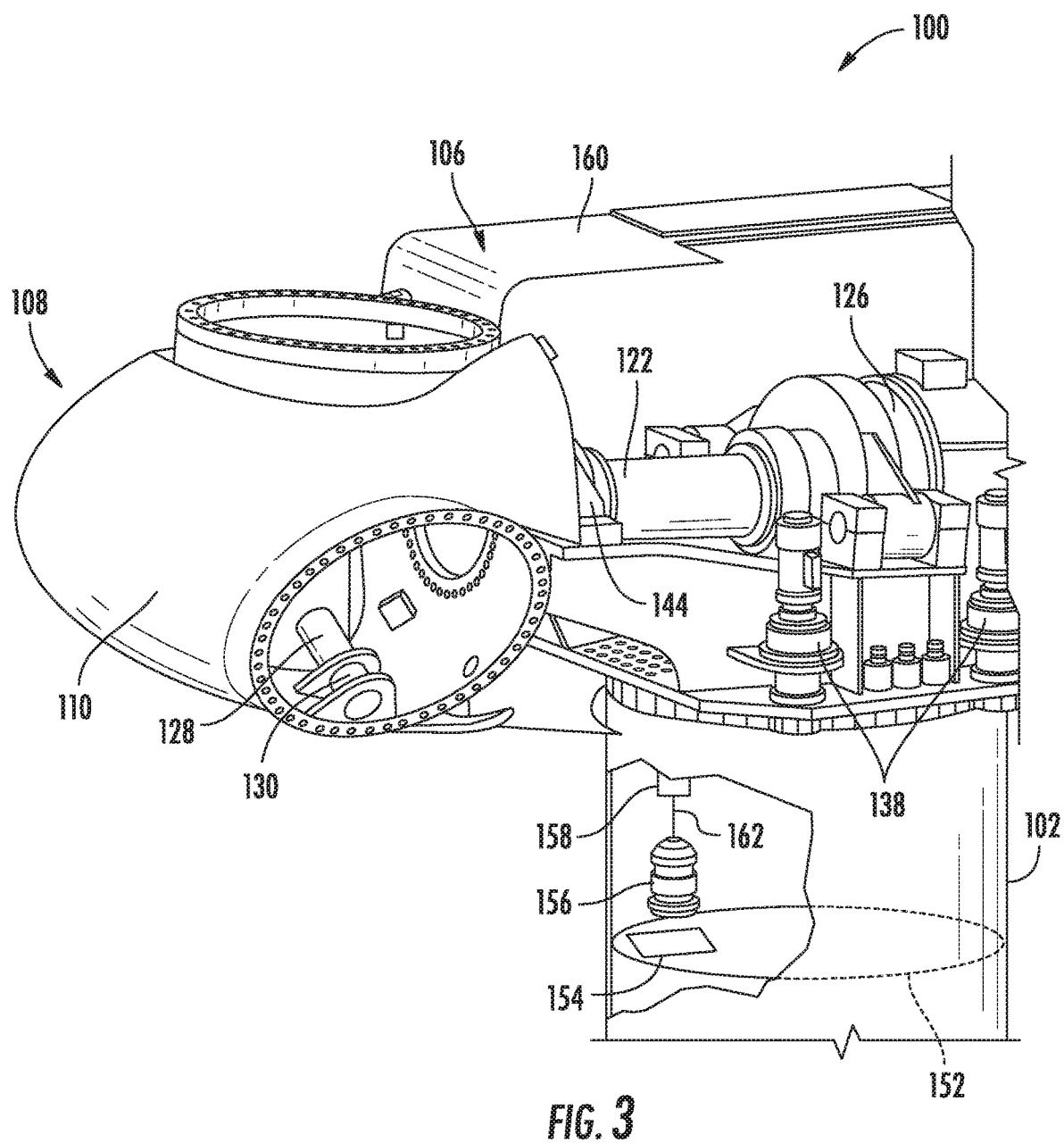
FIG. 3 illustrates a perspective, internal view of a portion of a nacelle and tower of the wind turbine according to one embodiment of the present disclosure.

Referring to FIG. 3, the wind turbine 100 may include at least one surface 152. In an embodiment, the surface(s) 152 may be a supportive surface and may have a generally horizontal orientation. The surface(s) 152 may, in at least one embodiment, be in, or a portion of, the nacelle 106. For example, the surface(s) 152 may be a portion of the outer shell 160. In such an embodiment, the surface(s) 152 may have a non-horizontal orientation. In an additional embodiment, the surface(s) 152 may be located within the tower 102. For example, as particularly depicted in FIG. 3, the surface(s) 152 may be a platform, such as a yaw platform, positioned within the tower 102 in order to support equipment or facilitate the servicing of the wind turbine 100.

In an embodiment, the surface(s) 152 may define at least one opening 154. The opening(s) 154 may be sized and positioned so as to permit access to various portions of the wind turbine 100 for example, in at least one embodiment, the opening(s) 154 may be a cargo passage opening positioned so as to facilitate the hoisting of a load 156 uptower. In an alternative embodiment, the opening(s) 154 may be a personnel passage opening positioned so as to allow personnel to access the various portions of the wind turbine 100. In at least one embodiment, the opening(s) 154 may be defined by the outer shell 160 and may facilitate access to the outer surface of the wind turbine 100. For example, the opening(s) 154 may be positioned so as to permit personnel to pass between inside the nacelle 106 and on top of the nacelle 106.

Figure 4:
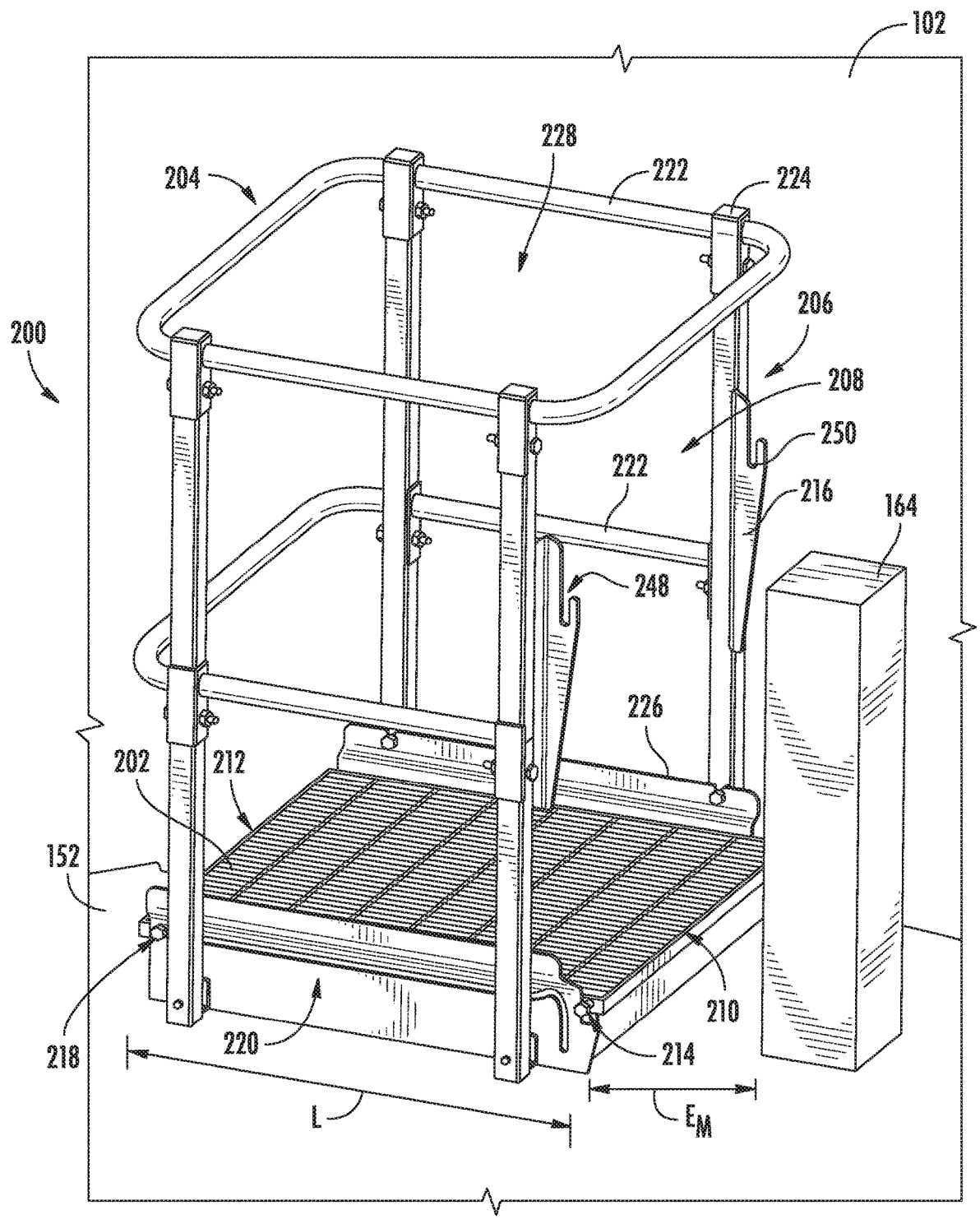
FIG. 4 illustrates a perspective view of a hatch assembly for a wind turbine, particularly illustrating the hatch assembly in a first position according to one embodiment of the present disclosure.

In at least one embodiment, the opening(s) 154 may be disposed in a space-constrained location. In such an embodiment, the available clearance around opening(s) 154 may be limited by at least one obstruction 164 (FIG. 4). The obstruction(s) 164 may, for example, be a structure of the wind turbine 100, such as a wall of the tower 102, an additional passageway of the wind turbine 100, and/or a component of the wind turbine 100 such as described herein. It should be appreciated that the reduction of the available clearance by the obstruction(s) 164 may, in turn, limit the space into which a covering of the opening may be swung, slid, or otherwise moved in order to provide access to the opening(s) 154.

In an embodiment, as shown in FIG. 3, the wind turbine 100 may be equipped with a lifting device 158. The lifting device 158 may be disposed above, and in line with, the opening(s) 154 the lifting device may be, for example, a winch, a crane, a hoist, and/or a block and tackle arrangement. The lifting device 158 may be operably coupled to the load 156 via a coupling element 162. The load 156 may include parts, components, tools, and/or supplies which may be coupled directly to the coupling element 162. In at least one embodiment, the load 156 may include a cargo bag or sling into which the parts, components, tools and/or supplies are placed, with the cargo bag or sling being coupled to the coupling element 162.

Figure 5:
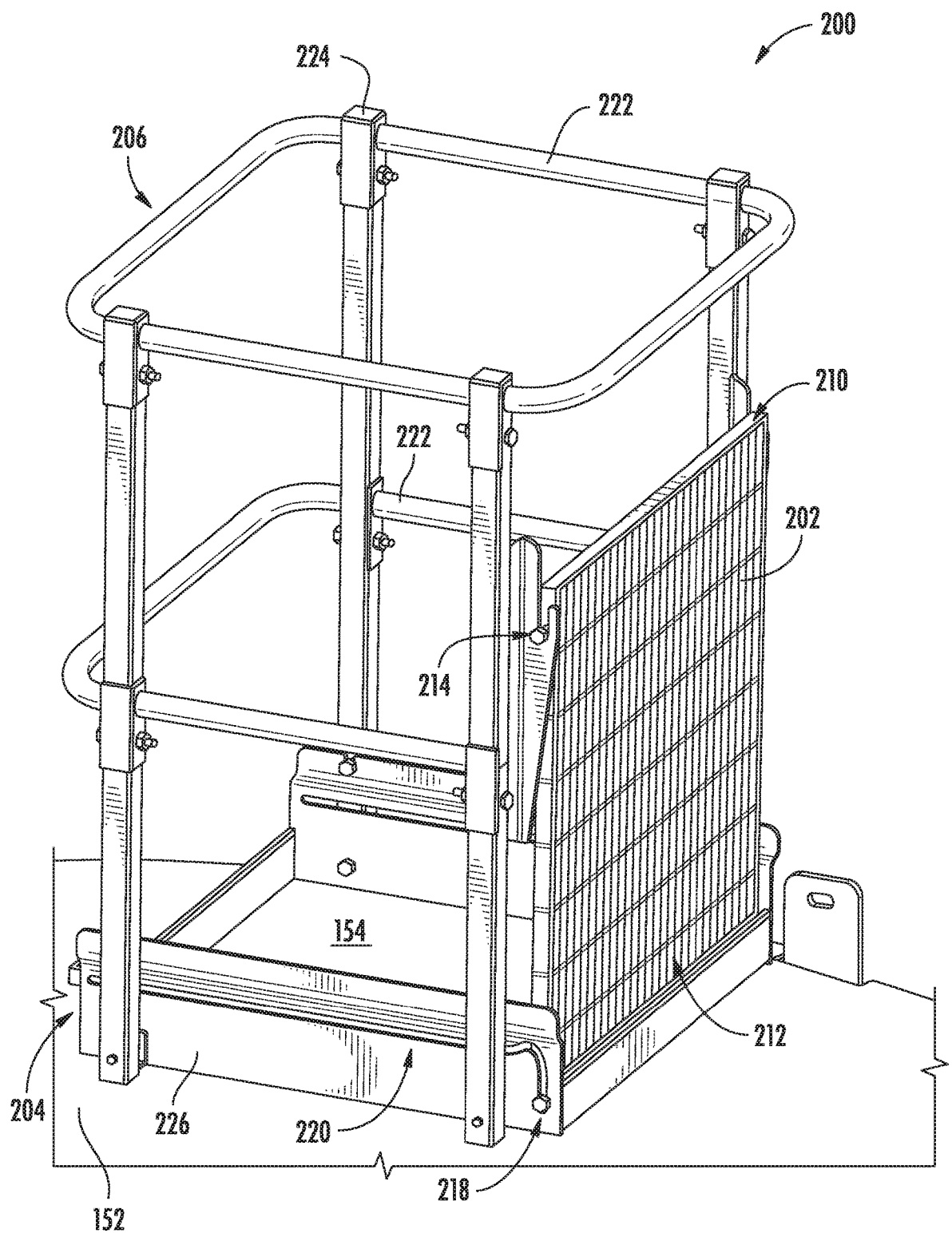
FIG. 5 illustrates a perspective view of the hatch assembly of FIG. 4 in a second position according to one embodiment of the present disclosure.

Referring now to FIGS. 4-8, a hatch assembly 200 for occluding the opening(s) 154 is presented according to the present disclosure. In an embodiment, the hatch assembly 200 may be arranged adjacent to the opening(s) 154. The hatch assembly may include a support surface 202 and a frame structure 204. The frame structure 204 may include a plurality of frame members 206 arranged together to at least partially surround the opening(s) 154. The plurality of frame members 206 may define a passageway 208 for receiving the support surface 202. The support surface 202 may be slidable between a first position, as depicted in FIG. 4, and a second position as depicted in FIG. 5. The support surface 202 may occlude the opening(s) 154 defined by the surface(s) 152 of the wind turbine 100 when the support surface 202 is in the first position. The support surface 202 may occlude the passageway 208 defined by the plurality of frame members of the frame structure when in the second position. It should be appreciated that occluding the opening(s) 154 and the passageway 208 may prevent exposure of personnel to the opening(s) 154.

In an embodiment, the support surface 202 may be a grate, plank, cover, sheet, composite structure or other supportive structure suitable for covering the opening(s) 154 and supporting the weight of personnel and/or a cargo load. The support surface 202 may, in an embodiment, be perforated so as to permit an airflow through the support surface 202. The support surface 202 may extend between a first end 210 and a second end 212 disposed opposite thereof. In at least one embodiment, the support surface 202 may be generally rectangular. In additional embodiments, however, the support surface 202 may be any other shape suitable for covering the opening(s) 154 so as to prevent exposure of personnel to the opening(s) 154. It should be appreciated that while depicted in FIGS. 4-8 as a planar structure, the support surface 202 may be contoured so as to conform to the surface(s) 152.

In an embodiment, the support surface 202 may have at least one locking pin 214 disposed at the first end 210. In at least one embodiment, a single locking pin 214 may span the support surface 202, while in an alternative embodiment, a pair of locking pins 214 may be included at the first end 210. The locking pin(s) 214 may, in an embodiment, such as depicted in FIG. 5, be positioned to be received by at least one pin receiver 216 coupled to the frame structure 204. The support surface 202 may also include at least one glide pin 218 disposed at the second end 212. In at least one embodiment, a single glide pin 218 may span the support surface 202, while in an alternative embodiment, a pair of glide pins 218 may be included at the second end 212. The glide pin(s) 218 may be configured to be retained by at least one guideway 220 defined by the frame structure 204. The locking pin(s) 214 and the glide pin(s) 218 may be a bolt, a rod, a shaft, or other similar structure. The locking pin(s) 214 and the glide pin(s) 218 may have a round cross-section or a multi-sided cross-section (e.g., square, hexagonal, octagonal, etc.). The locking pin(s) 214 and the glide pin(s) 218 may include at least one washer and may also include at least one bushing. It should be appreciated that the at least one bushing may roll along the guideway(s) 220.

It should be appreciated that in an additional embodiment, the hatch assembly 200 may include more than one support surface 202. For example, in an embodiment, the dimensions of the opening(s) 154 may be such that covering the opening with a unitary support surface 202 would require a unitary support surface 202 having dimensions which are unwieldy or otherwise undesirable. In such an embodiment, a pair of support surfaces 202 may be arranged so that the respective second ends 212 are arranged in contact with one another.

Referring still to FIGS. 4-8, the hatch assembly 200 may include the frame structure 204, which may include the plurality of frame members 206. In at least one embodiment, the frame structure 204 may form a barrier (e.g., a railing) at least partially around the opening(s) 154. The plurality of frame members 206 may define a working volume 228 extending at least between the opening(s) 154 and a frame member of the plurality of frame members 206 oriented substantially parallel to the surface(s) 152. As such, in an embodiment, the plurality of frame members 206 may include at least one rail member(s) 222, at least one rail support member 224, and/or at least one base member 226. In at least one embodiment, the rail member 222 may be coupled to the rail support member(s) 224. The rail support member(s) 224 may, in turn, be coupled to the base member(s) 226, with the base member(s) 226 being coupled to the surface(s) 152. In at least one embodiment, access to the opening(s) 154 may be provided by the passageway 208 defined by the rail member(s) 222, the rail support member(s) 224, and/or the base member(s) 226. It should be appreciated that the plurality of frame members 206 may include tubular components (e.g., piping, square stock, etc.) as well as planar components (e.g., sheet materials).

Also as depicted in FIGS. 4-8, the frame structure 204 may define one or more guideway(s) 220. As particularly depicted in FIG. 6, the guideway(s) 220 may, in an embodiment, define a guide path 230 for either the first end 210 or the second end 212 of the support surface 202. In at least one embodiment, the guideway(s) 220 may be defined by the base member(s) 226 and may retain the glide pin(s) 218. In an additional embodiment, the hatch assembly 200 may include a pair of base members 226 disposed in parallel about the opening(s) 154, with each of the base members 226 defining a guideway 220. It should be appreciated that the guide path 230 may define a movement path for the support surface 202. For example, in an embodiment wherein the glide pin(s) 218 is retained in the guideway(s) 220, a vertical movement of the glide pin(s) 218 in response to the geometry of the guide path 230 may result in a corresponding vertical movement of the first end 210.

Referring still to FIGS. 4-8, and in particular to FIG. 6, in an embodiment, the guideway(s) 220, and by extension the guide path 230, may further include a first guide path portion 232. The first guide path portion 232 may be oriented generally parallel to the surface(s) 152 of the wind turbine 100. The guideway(s) 220 and guide path 230, may also include a second guide path portion 234 oriented generally perpendicular to the surface(s) 152 of the wind turbine 100. The second guide path portion 234 may be positioned proximate to the passageway 208 defined by the frame structure 204. The guideway(s) 220 and guide path 230 may also, in at least one embodiment, include a transitional guide path portion 236. The transitional guide path portion 236 may be operably coupled the first guide path portion 232 to the second guide path portion 234. In at least one embodiment, the transitional guide path portion 236 may include an arch having a distance ($D_1$) from the surface(s) 152 which is greater than the distance ($D_2$) from the surface of the first guide path portion 232. Additionally, the second guide path portion 234 may have a terminal end 238 having a distance ($D_3$) from the surface(s) 152 which is less than the distance ($D_2$) of the first guide path portion 232.

Figure 7A:
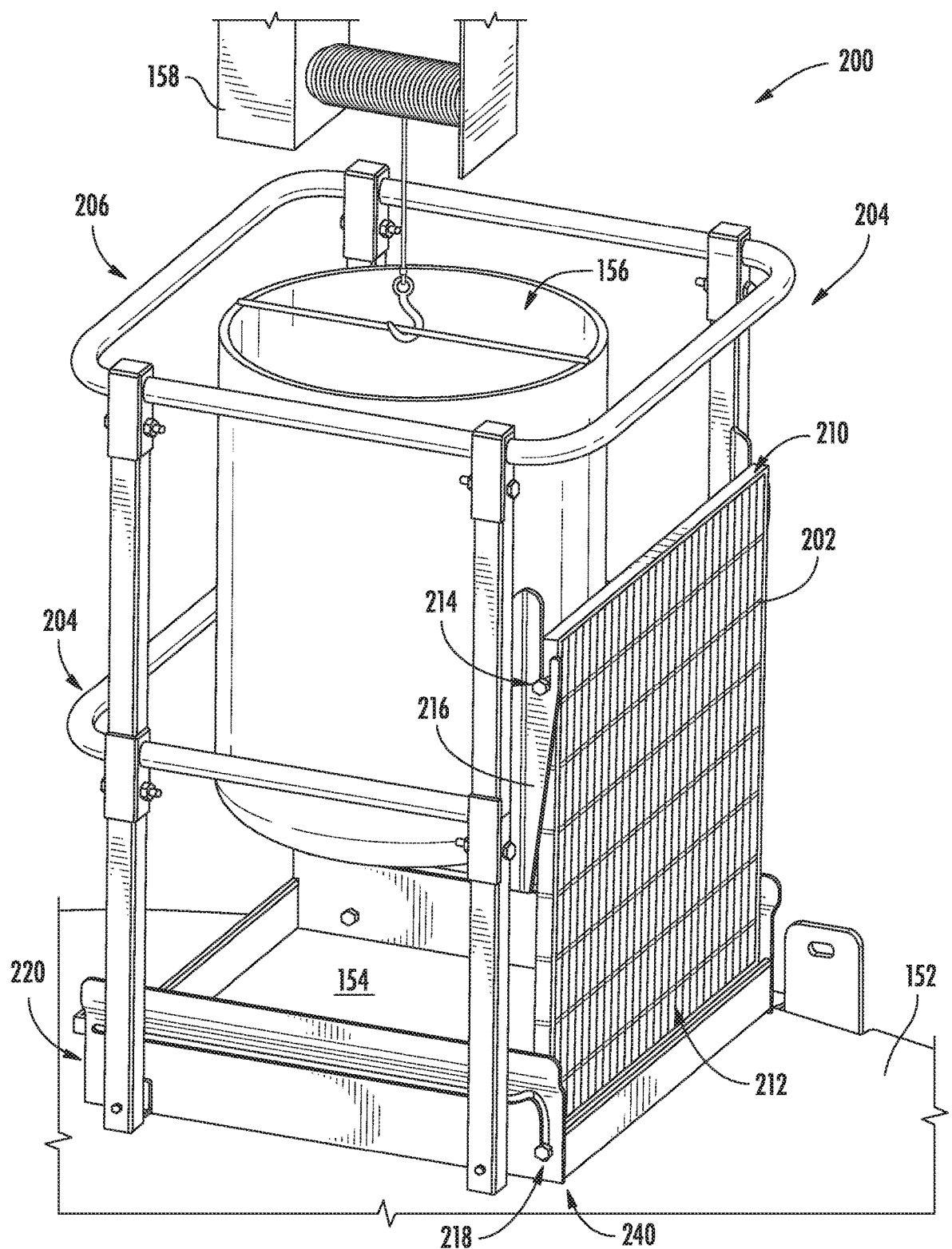
FIGS. 7A-7D illustrate a perspective view of the hatch assembly of FIG. 4 transitioning from a second position to a first position according to one embodiment of the present disclosure.
Figure 7B:
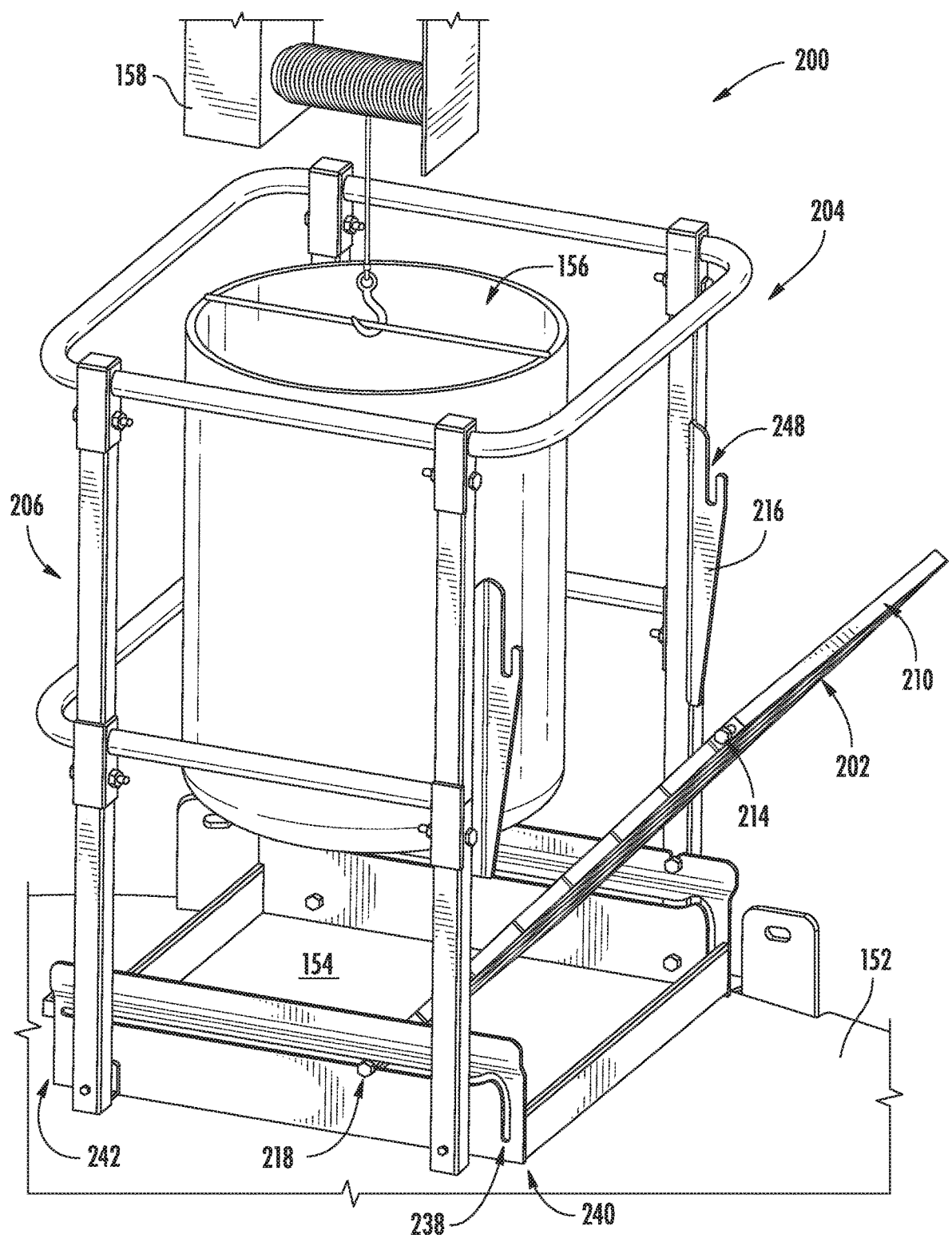
Figure 7C:
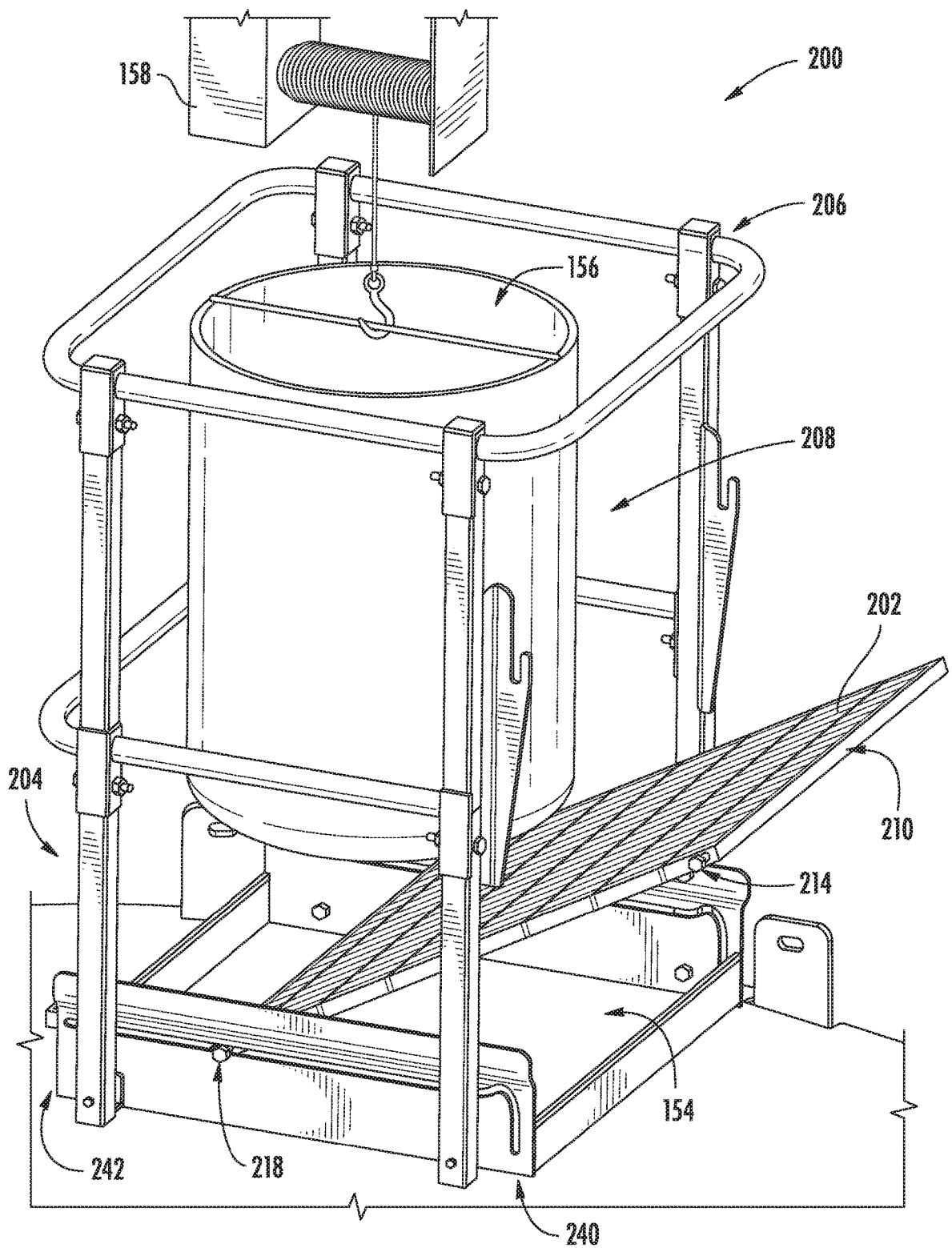
Figure 7D:
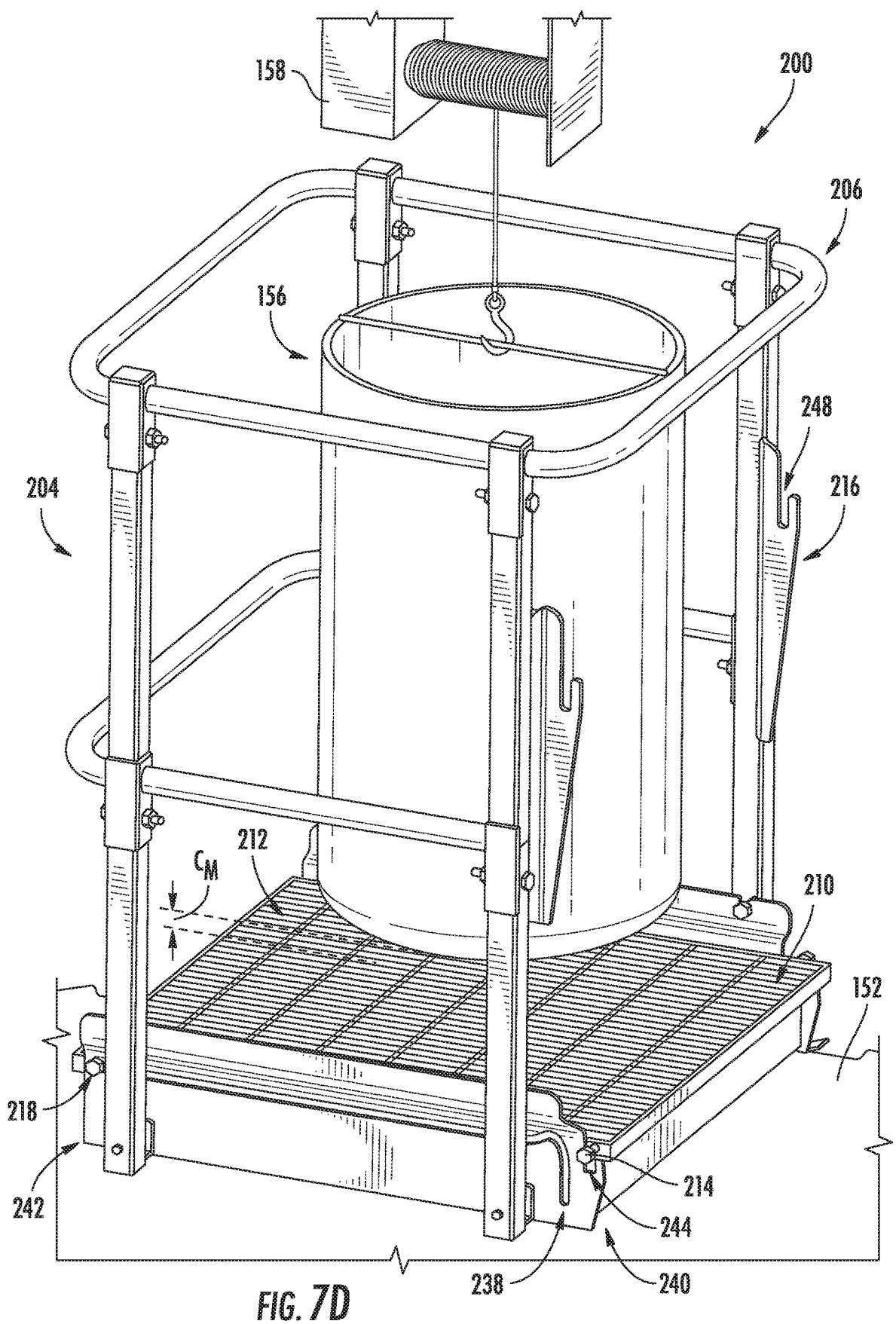
Figure 8:
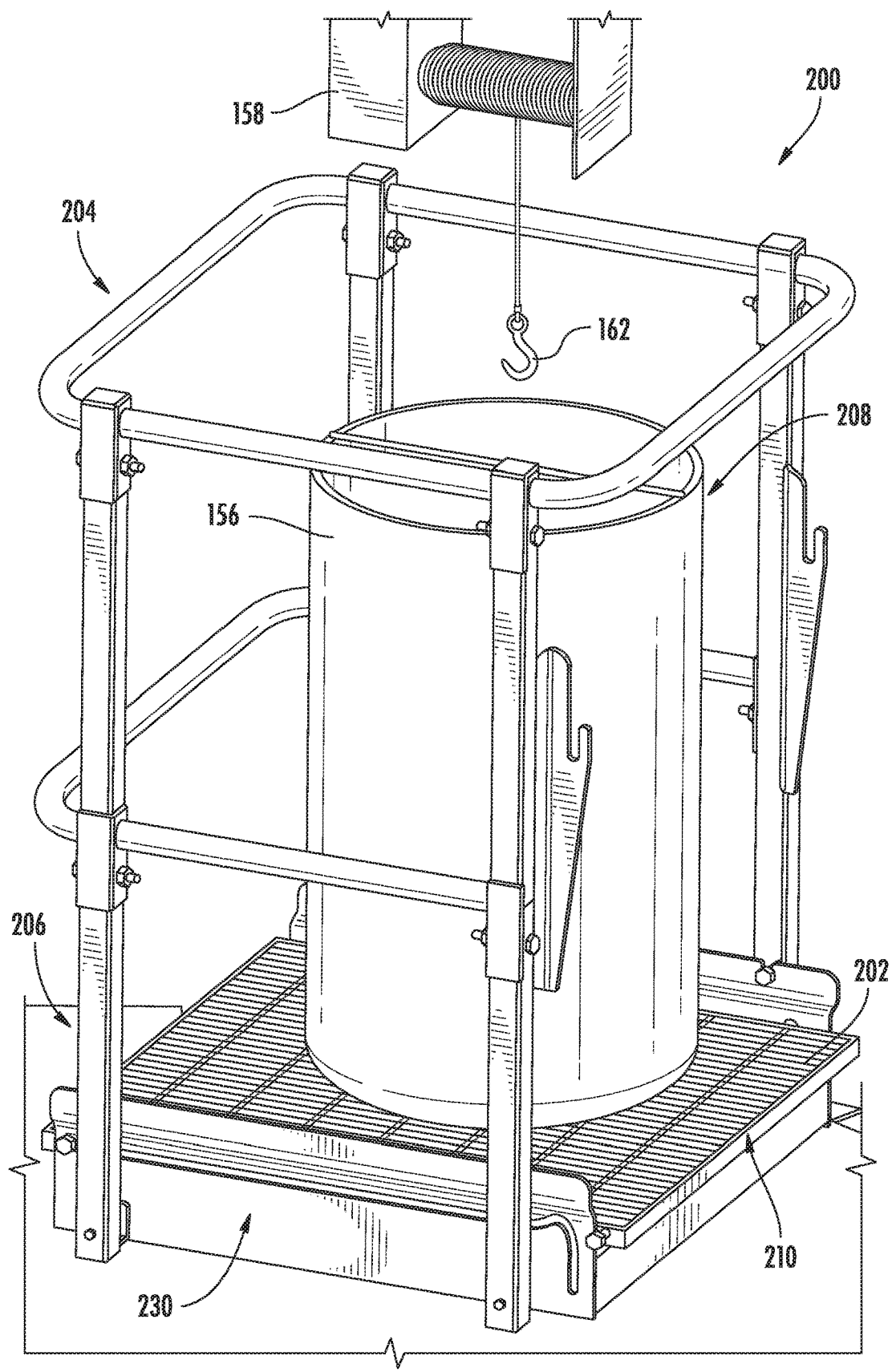
FIG. 8 illustrates a perspective view of the hatch assembly of FIG. 4, particularly illustrating a load supported by the hatch assembly in the first position according to one embodiment of the present disclosure.

As depicted in FIGS. 4, 7D, and 8, in an embodiment, the support surface 202 has a first position which occludes the opening(s) 154 and prevents exposure of personnel to the opening(s) 154. When in the first position, the support surface 202 may be oriented generally parallel to the surface(s) 152. In at least one embodiment, when the support surface 202 is in the first position, the glide pin(s) 218 may be located in the first guide path portion 232. In an additional embodiment, the first position may include the first end 210 being located proximate to the passageway 208, while the second end 212 is positioned distally relative to the passageway 208. In other words, in an embodiment, the guideway(s) 220 may include a first guideway end 240 proximal to the passageway 208 and a second guideway end 242 disposed opposite thereof. In such an embodiment, the first position may include the first end 210 being positioned proximate to the first guideway end 240 and the second end 212 being positioned proximate to the second guideway end 242.

As particularly depicted in FIGS. 5 and 7A, the support surface 202 has a second position which occludes the passageway 208 defined by the plurality of frame members 206 of the frame structure 204 and prevents exposure of personnel to the opening 154 in an uncovered condition. When in the second position, the support surface 202 may be oriented generally perpendicular to the surface(s) 152. In at least one embodiment, when the support surface 202 is in the second position, the glide pin(s) 218 may be located in the second glide path portion 234 adjacent to the terminal end 238. The second position may also include the locking pin(s) 214 being positioned within the pin receiver 216. The pin receiver 216 may be configured to secure the support surface 202 in the second position. In at least one embodiment, the second position may include the first end 210 and the second end 212 being located proximate to the passageway 208. It should be appreciated that in the second position, the support surface 202 may serve to complete the surrounding of the opening(s) 154 by the frame structure 204. Additionally, it should be appreciated that utilizing the support surface 202 to both occlude the opening(s) 154 and the passageway 208, may alleviate the need to provide a separate gate element in order to limit the exposure of personnel to the uncovered opening(s) 154. This may, in turn, reduce the cost of the hatch assembly 200, or other fall protection system of the wind turbine 100.

Referring now to FIGS. 7A-7D in sequence, the support surface 202 of the hatch assembly 200 may, in an embodiment, be at least slidable between the first position and the second position. Transitioning from the second position to the first position may remove the obstruction to the passageway 208 and result in the occlusion of the opening(s) 154. In an embodiment, transitioning from the second position to the first position may involve moving the support surface 202 perpendicular to the surface(s) 152 so as to disengage the pin receiver 216. In other words, in an embodiment, the transition from the second position to the first position may be initiated by lifting the support surface 202. This may cause the locking pin(s) 214 to exit the pin receiver 216 and the glide pin(s) 218 to move along the second glide path portion 234 to a peak 246 of the transitional guide path portion 236. With the locking pin(s) 214 disengaged from the pin receiver 216, the first end 210 of the support surface 202 may be moved (e.g., lowered) toward the surface(s) 152. This movement may initiate a sliding of the glide pin(s) 218 along the guide path 230 in the direction of the second guideway end 242. As used herein, versions of "slide" refer to any movement of the glide pins(s) 218 along the glide path (e.g., sliding, gliding, and/or rolling). The movement (e.g. lowering) of the first end 210 may also result in a rotation of the support surface 202 about the glide pin(s) 218. In an additional embodiment, the movement of the first end 210 toward the surface(s) 152 may result in the movement of the second end 212 away from the passageway 208. It should be appreciated that because the movement of the first end 210 occurs simultaneously with the movement of the second end 212, the amount clearance required to transition the support surface 202 between the second position and the first position is reduced. It should be further appreciated that in at least one embodiment, it may be possible to transition the support surface 202 between the first and second positions within the footprint of the frame structure 204.

Referring now to FIGS. 7D-7A in sequence, transitioning from the first position to the second position may, in an embodiment, uncover the opening(s) 154 and occlude the passageway 208. In an embodiment, transitioning from the first position to the second position may include moving (e.g., lifting) the first end 210 of the support surface 202 away from the surface(s) 152. This movement may result in a rotation of the support surface 202 about the glide pin(s) 218. The movement may also result in the glide pin(s) 218 sliding along the first guide path portion 232 from the second guideway end 242 toward the transitional guide path portion 236. As such, as a distance between the first end 210 and the surface(s) 152 increases, the distance between the second end 212 and the passageway 208 may decrease.

In an embodiment, as the glide pin(s) 218 slides toward the first guideway end 240 in response to the movement of the first end 210, the glide pin(s) 218 encounter a peak 246 of the transitional guide path portion 236. In at least one embodiment, the peak 246 may be the point of the guide path 230 having a maximal distance from the surface(s) 152. In an additional embodiment, transitioning the glide pin(s) 218 from the first guide path portion 232 to the peak 246 may result in an increase in the distance between the second end 212 and the surface(s) 152. By extension, this increase in distance may also result in the locking pin(s) 214 moving further from the surface(s) 152. The movement of the locking pin(s) 214 away from the surface(s) 152 may position the locking pin(s) 214 to be received by the pin receiver 216. For example, in an embodiment wherein the surface(s) 152 is generally horizontal, sliding the glide pin(s) 218 up to the peak 246 may result in the locking pin(s) 214 being positioned above an opening 248 of the pin receiver 216. With the locking pin(s) 214 positioned to be received by the pin receiver 216, the support surface 202 may be further transitioned to the second position by moving the support surface 202 into an orientation perpendicular to the surface(s) 152. In an embodiment, the support surface 202 may be secured in the second position by moving the support surface 202 toward the surface(s) 152. Thus, securing the support surface 202 in the second position may include causing the glide pin(s) 218 to move along the glide path 230 toward the terminal end 238. In an additional embodiment, securing the support surface 202 in the second position may also include moving the locking pin(s) 214 past the opening 248 of the pin receiver 216 and into the pin receiver 216. For example, in an embodiment wherein the surface(s) 152 is generally horizontal, the support surface 202 may be secured in the second position by lowering the locking pin(s) 214 and the glide pin(s) 218 into the pin receiver 216 and the second glide path portion 234 respectively.

Referring again to FIGS. 4-8, in an embodiment, the frame structure 204 may include the pin receiver 216 positioned to receive the locking pin(s) 214. In an additional embodiment, the pin receiver 216 may be positioned on the plurality of frame members 206 so as to prevent the first end 210 of the support surface 202 from passing into the passageway 208 defined by the plurality of frame members 206 of the frame structure 204. For example, in an embodiment, the pin receiver 216 may prevent the uncovering of the opening(s) 154 via a hinge motion, wherein the second end 212 of the support surface 202 remains in place during an opening operation. It should be appreciated that precluding the utilization of the hinge motion may also prevent the exposure of personnel to both an open passageway 208 and the opening(s) 154.

In an embodiment, the pin receiver 216 may be a unitary construction and may be absent any movable elements. As such, the pin receiver 216 may in at least one embodiment, be formed from a sheet material. The pin receiver 216 may be formed with a "J" profile. In at least one embodiment, the pin receiver 216 may include a receiving arc 250 disposed between the opening 248 of the pin receiver 216 and the surface(s) 152. The receiving arc 250 may be configured to support the locking pin(s) 214 when the support surface 202 is secured in the second position.

Referring still to FIGS. 4-8, in an embodiment, the frame structure 204 may also include at least one securing element 244. The securing element(s) 244 may retain the locking pin(s) 214 when the support surface 202 is in the first position, such as particularly depicted in FIG. 7D. As such, the securing element(s) 244 may be configured to secure the support surface 202 in the first position. It should be appreciated that securing the support surface 202 in the first position may prevent a movement of the support surface 202 parallel to the surface(s) 152. In at least one embodiment, the movement may be a horizontal movement of the support surface 202.

As depicted in FIG. 4, the hatch assembly 200 may be employed in a space restricted environment. In such an embodiment, an obstruction(s) 164 may preclude a full extension more swing of the support surface 202 as the support surface 202 is transitioned between the first position and the second position. For example, in at least one embodiment, the first end 210 of the support surface 202 may have a maximal extension ($E_M$) beyond the frame structure 204 of less than or equal to 30% of a length (L) of the support surface 202. For example, in at least one embodiment, an obstruction(s) 164 may positioned no closer to the footprint of the frame structure 204 than 30% of the length (L) of the support surface 202. In such a position, the presence of the obstruction(s) 164 may not interfere with the transitioning of the support surface 202 between the first and second positions. It should be appreciated that the restriction on the location of the obstruction(s) 164 may apply only when the obstruction is positioned proximate to the passageway 208 and the first end 210. It should be further appreciated that the obstruction(s) 164 may be positioned in contact with the frame structure 204 when located away from the passageway 208.

Referring again to FIGS. 7A-7D, in at least one embodiment, the working volume 228 defined by the frame structure 204 may be occupied by the load 156. However, the transitioning of the support surface 202 between the first position and the second position as described herein may be accomplished with the load 156 suspended above the support surface 202. In an embodiment, a minimum clearance ($C_M$) between the suspended load 156 and the support surface 202 may be one inch. For example, in at least one embodiment, the load 156 may be suspended above the support surface 202 with a clearance ($C_M$) between the support surface 202 and the load 156 being greater than one (1) centimeter to less than 35 centimeters. For example, in an embodiment, the clearance ($C_M$) may be greater than 2.5 and less than 30 centimeters. It should be appreciated that the ability to transition the support surface 202 between the first position and the second position while a load 156 occupies the working volume 228, may facilitate the hatch assembly 200 preventing exposure of personnel to the uncovered opening(s) 154.

It should also be appreciated that the ability to transition the support surface 202 from the second position to the first position while the load 156 is suspended above the opening(s) 154 may permit the covering of the opening(s) 154 following the hoisting of the load 156, prior to decoupling the load 156 from the lifting device 158. In at least one embodiment, the support surface 202 may be transitioned to the first position by sliding the second end 212 beneath the suspended load 156. With the opening(s) 154 occluded by the support surface 202 in the first position, the load 156 may be lowered onto the support surface 202. As depicted in FIG. 8, with the load 156 supported by the support surface 202, the load may be decoupled from the lifting device 158. In an additional embodiment, the load 156 may be placed on the support surface 202 prior to coupling the load 156 to the lifting device 158. It should be appreciated that the ability to manipulate the load 156 while the opening(s) 154 is occluded may serve to prevent exposure of personnel to the opening(s) 154.

Figure 9:
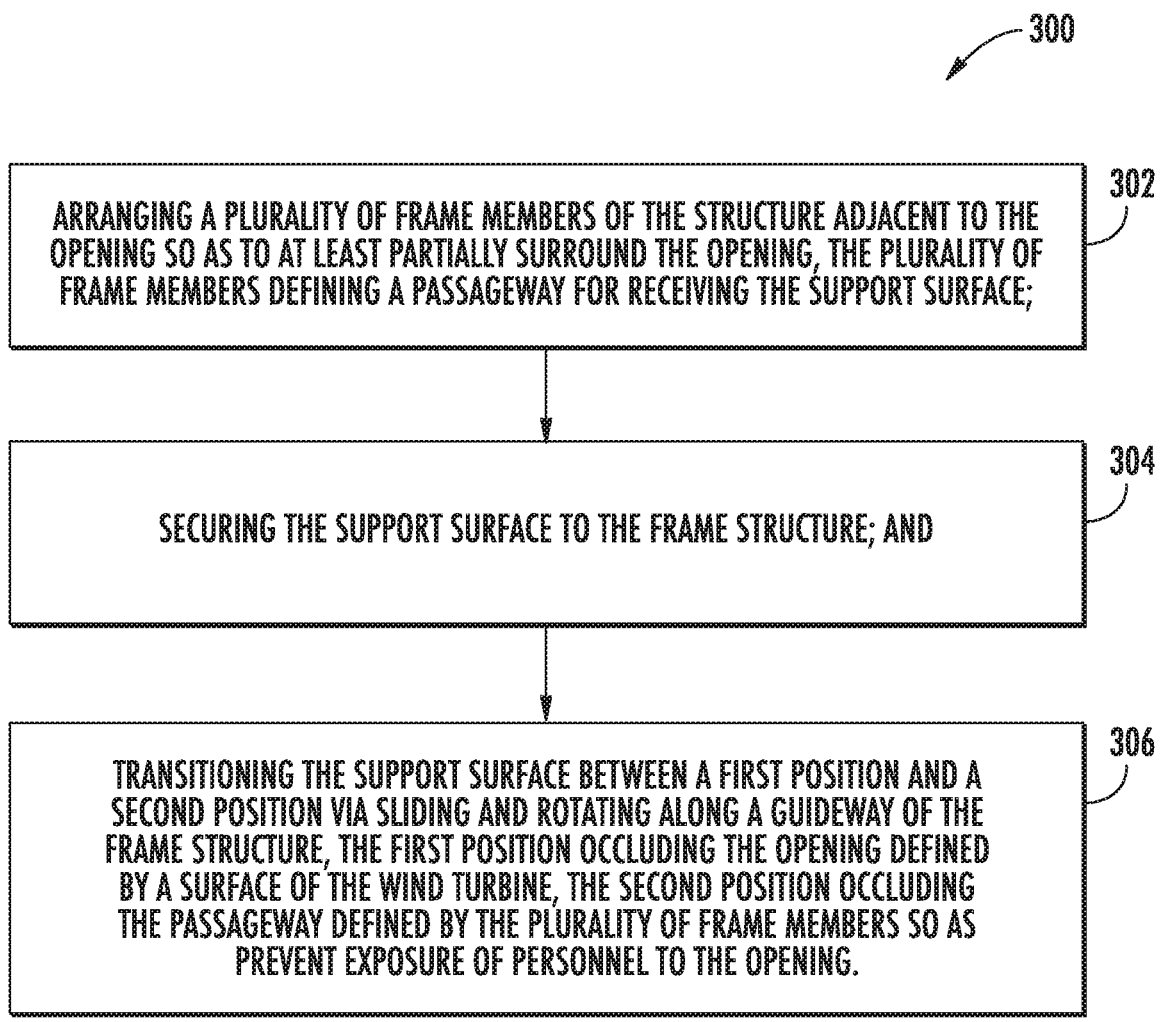
FIG. 9 illustrates a flow diagram of one embodiment of a method for operating hatch assembly to occlude an opening of a wind turbine according to the present disclosure.

Referring now to FIG. 9, a flow diagram of one embodiment of a method 300 for operating a hatch assembly to occlude an opening of a wind turbine is illustrated. The method 300 may be implemented using, for instance, the hatch assembly 200 discussed above with references to FIGS. 4-8. FIG. 9 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include arranging a plurality of frame members of the frame structure adjacent to the opening so as to at least partially surrounded opening. The plurality of frame members may define a passageway for receiving the support surface. As shown at (304), the method 300 may include securing the support surface to the frame structure. As shown at (306), the method 300 may include transitioning the support surface between a first position and a second position via at least sliding along a guideway of the frame structure. The first position may occlude the opening defined by a surface of the wind turbine. The second position may occlude the passageway defined by the plurality of frame members so as to prevent exposure of personnel to the opening.

In an embodiment, the method may also include actuating a lifting device disposed above, and in line with, the opening. The method may further include hoisting a load through the opening and suspending the load above the opening.

In an additional embodiment, the method may include moving the support surface perpendicular to the surface so as to disengage at least one locking pin from at least one pin receiver of the frame structure. The method may also include rotating and sliding a second end of the support surface between the opening and the suspended load so as to transition the support surface from the second position to the first position. A clearance between the support surface and the suspended load may be greater than 2.5 to less than 30 centimeters.

In yet another embodiment, the method may include lowering the load onto the support surface in the first position and decoupling the load from the lifting device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A wind turbine, comprising a tower; a nacelle mounted atop the tower; a rotor mounted to the nacelle, the rotor comprising a rotatable hub having one or more rotor blades secured thereto; an opening defined by a surface of the wind turbine; and a hatch assembly arranged adjacent to the opening, the hatch assembly comprising a frame structure and a support surface, the frame structure comprising a plurality of frame members arranged together to at least partially surround the opening, the plurality of frame members further defining a passageway for receiving the support surface, the support surface being slidable between a first position and a second position, wherein the support surface occludes the opening defined by the surface of the wind turbine when the support surface is in the first position, and wherein the support surface occludes the passageway defined by the plurality of frame members of the frame structure when in the second position so as prevent exposure of personnel to the opening defined by the surface of the wind turbine.

Clause 2. The wind turbine of any preceding clause, wherein the frame structure defines at least one guideway, the guideway defining a guide path for an end of the support surface.

Clause 3. The wind turbine of any preceding clause, wherein the guideway further comprises a first guide path portion oriented parallel to the surface of the wind turbine; a second guide path portion oriented perpendicular to the surface of the wind turbine, the second guide path portion being positioned proximate to the passageway defined by the frame structure; and a transitional guide path portion operably coupling the first guide path portion to the second guide path portion.

Clause 4. The wind turbine of any preceding clause, wherein the support surface extends between a first end and a second end disposed opposite thereof, the support surface having at least one locking pin disposed at the first end and at least one glide pin disposed at the second end, wherein the at least one glide pin is configured to be retained by at least one guideway defined by the frame structure, and wherein the at least one locking pin is positioned to be received by at least one pin receiver of the frame structure so as to secure the support surface in the second position.

Clause 5. The wind turbine of any preceding clause, wherein the at least one pin receiver is positioned on the plurality of frame members so as to prevent the first end of the support surface from passing into the passageway defined by the plurality of frame members of the frame structure.

Clause 6. The wind turbine of any preceding clause, wherein the first end of support surface has a maximal extension beyond the frame structure of less than or equal to 30% of a length of the support surface.

Clause 7. The wind turbine of any preceding clause, wherein the frame structure further comprises at least one securing element configured to receive the at least one locking pin of the support surface and secure the support surface in the first position, wherein the securing of the support surface prevents a horizontal movement of the support surface.

Clause 8. The wind turbine of any preceding clause, wherein the opening is a cargo passage opening, the wind turbine further comprising a lifting device disposed above and in line with the cargo passage opening.

Clause 9. The wind turbine of any preceding clause, wherein the lifting device supports a load suspended above the support surface, wherein a vertical clearance between the support surface and the load is greater than 2.5 centimeters to less than 30 centimeters.

Clause 10. A method for operating a hatch assembly to occlude an opening of a wind turbine, the hatch assembly having a frame structure and a support surface, the method comprising arranging a plurality of frame members of the frame structure adjacent to the opening so as to at least partially surround the opening, the plurality of frame members defining a passageway for receiving the support surface; securing the support surface to the frame structure; and transitioning the support surface between a first position and a second position sliding and rotating along a guideway of the frame structure, the first position occluding the opening defined by a surface of the wind turbine, the second position occluding the passageway defined by the plurality of frame members so as prevent exposure of personnel to the opening.

Clause 11. The method of any preceding clause, wherein the support surface extends between a first end and a second end disposed opposite thereof, the support surface having at least one locking pin disposed at the first end and at least one glide pin disposed at the second end, wherein the at least one glide pin is configured to be retained by at least one guideway defined by the frame structure, and wherein transitioning the support surface further comprises raising or lowering the first end of the support surface relative to the surface of the wind turbine so as to cause the second end of the support surface to rotate and slide along the guideway portion of the frame structure.

Clause 12. The method of any preceding clause, wherein transitioning the support surface into the second position further comprises transitioning the support structure into a perpendicular orientation relative to the surface of the wind turbine by raising the first end of the support surface above at least one pin receiver coupled to the plurality of frame members; and moving the second end of the support surface toward the surface defining the opening so as to secure the at least one locking pin in the at least one pin receiver thereby occluding the passageway defined by the plurality of frame members of the frame structure and securing the support surface in the second position.

Clause 13. The method of any preceding clause, further comprising actuating a lifting device disposed above and in line with the opening; hoisting a load through the opening; and suspending the load above the opening.

Clause 14. The method of claim 13, further comprising moving the support surface perpendicular to the surface so as to disengage at least one locking pin from at least one pin receiver of the frame structure; and rotating and sliding a second end of the support surface between the opening and the suspended load so as to transition the support surface from the second position to the first position, wherein a clearance between the support surface and the suspended load is greater than 2.5 centimeters to less than 30 centimeters.

Clause 15. The method of any preceding clause, further comprising lowering the load onto the support surface in the first position; and decoupling the load from the lifting device.

Clause 16. The method of any preceding clause, wherein transitioning the support surface between the first position and second position via the guideway further comprises transitioning the support surface between the first position and the second position via a guide path defined by the guideway, the guide path further comprising a first guide path portion oriented parallel to the surface; a second guide path portion oriented perpendicular to the surface, the second guide path portion being positioned proximate to the passageway defined by the frame structure; and a transitional guide path portion operably coupling the first guide path portion to the second guide path portion.

Clause 17. The method of any preceding clause, wherein transitioning the support surface between the first position and the second position occurs in a space restricted environment wherein an obstruction limits a first end of the support surface to a maximal extension beyond the frame structure of less than or equal to 30% of a length of the support surface.

Clause 18. A hatch assembly arranged adjacent to an opening defined by a surface, the hatch assembly comprising a support surface extending between a first end and a second end disposed opposite thereof, the support surface having at least one locking pin disposed at the first end and at least one glide pin disposed at the second end, the support surface being at least slidable between a first position and a second position; and a frame structure comprising a plurality of frame members arranged together to at least partially surround the opening, the plurality of frame members further defining a passageway for receiving the support surface, the frame structure defining at least one guideway defining a guide path for the glide pin of the support surface retained therein, the guideway comprising a first guide path portion oriented parallel to the surface, a second guide path portion oriented perpendicular to the surface, and a transitional guide path portion operably coupling the first guide path portion to the second guide path portion, wherein the second guide path portion is positioned proximate to the passageway defined by the frame structure, wherein the support surface occludes the opening defined by the surface when the support surface is in the first position, wherein the support surface occludes the passageway defined by the plurality of frame members of the frame structure when in the second position so as to prevent exposure of personnel to the opening defined by the surface, and wherein the at least one locking pin is positioned to be received by at least one pin receiver of the frame structure so as to secure the support surface in the second position.

Clause 19. The hatch assembly of any preceding clause, wherein a vertical clearance between the support surface and a load suspended above the support surface is greater than 2.5 centimeters to less than 30 centimeters.

Clause 20. The hatch assembly of any preceding clause, wherein the first end of the support surface has a maximal extension beyond the frame structure of less than or equal to 30% of a length of the support surface.

What is claimed is:

1. A wind turbine, comprising:
   a tower;
   a nacelle mounted atop the tower;
   a rotor mounted to the nacelle, the rotor comprising a rotatable hub having one or more rotor blades secured thereto;
   an opening defined by a surface of the wind turbine; and
   a hatch assembly arranged adjacent to the opening, the hatch assembly comprising a frame structure and a support surface, the frame structure comprising a plurality of frame members arranged together to at least partially surround the opening, the plurality of frame members further defining a passageway for receiving the support surface, the support surface being slidable between a first position in which the support surface is oriented generally parallel to the surface and a second position in which the support surface is oriented generally perpendicular to the surface,
   wherein the support surface occludes the opening defined by the surface of the wind turbine when the support surface is in the first position, and wherein the support surface occludes the passageway defined by the plurality of frame members of the frame structure when in the second position so as to prevent exposure of personnel to the opening defined by the surface of the wind turbine; and
   wherein the plurality of frame members of the frame structure are fixed relative to the support surface when the support surface slides between the first position and the second position, and wherein the plurality of frame members define the passageway when the support surface is in the first position and when the support surface is in the second position.

2. The wind turbine of claim 1, wherein the frame structure defines at least one guideway, the guideway defining a guide path for an end of the support surface.

3. The wind turbine of claim 2, wherein the guideway further comprises:
   a first guide path portion oriented parallel to the surface of the wind turbine;
   a second guide path portion oriented perpendicular to the surface of the wind turbine, the second guide path portion being positioned proximate to the passageway defined by the frame structure; and
   a transitional guide path portion operably coupling the first guide path portion to the second guide path portion.

4. The wind turbine of claim 1, wherein the support surface extends between a first end and a second end disposed opposite thereof, the support surface having at least one locking pin disposed at the first end and at least one glide pin disposed at the second end, wherein the at least one glide pin is configured to be retained by at least one guideway defined by the frame structure, and wherein the at least one locking pin is positioned to be received by at least one pin receiver of the frame structure so as to secure the support surface in the second position.

5. The wind turbine of claim 4, wherein the at least one pin receiver is positioned on the plurality of frame members so as to prevent the first end of the support surface from passing into the passageway defined by the plurality of frame members of the frame structure.

6. The wind turbine of claim 4, wherein the first end of support surface has a maximal extension beyond the frame structure of less than or equal to 30% of a length of the support surface.

7. The wind turbine of claim 4, wherein the frame structure further comprises at least one slot configured to receive the at least one locking pin of the support surface and secure the support surface in the first position, wherein the securing of the support surface prevents a horizontal movement of the support surface.

8. The wind turbine of claim 1, wherein the opening is a cargo passage opening, the wind turbine further comprising a lifting device disposed above and in line with the cargo passage opening.

9. The wind turbine of claim 8, wherein the lifting device supports a load suspended above the support surface, wherein a vertical clearance between the support surface and the load is greater than 2.5 centimeters to less than 30 centimeters.

* * * * *